July 27, 1954     A. M. SWENSON     2,684,796
COMBINATION CAR TOP CARRIER AND BOAT
Filed Aug. 29, 1949
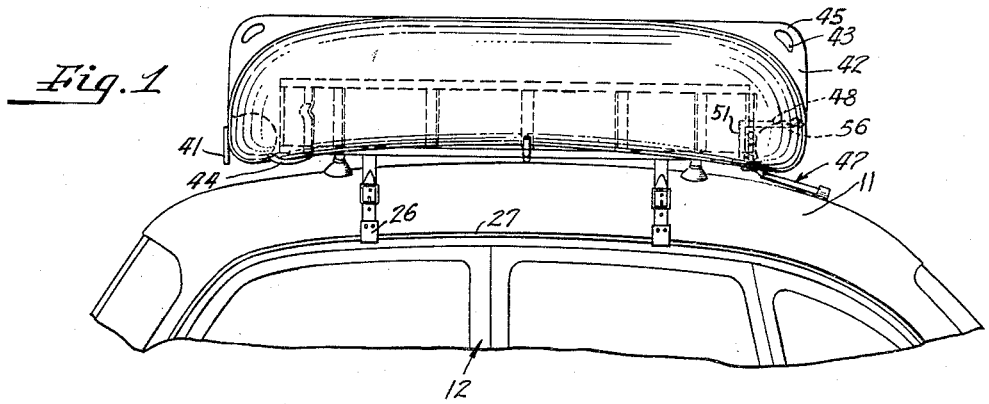
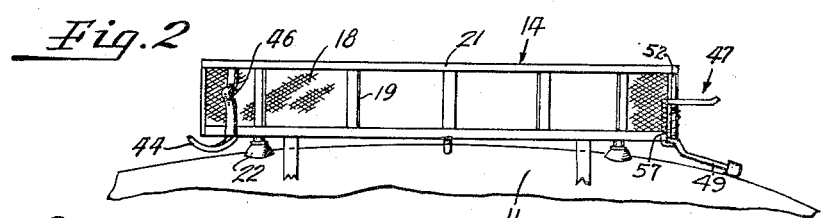
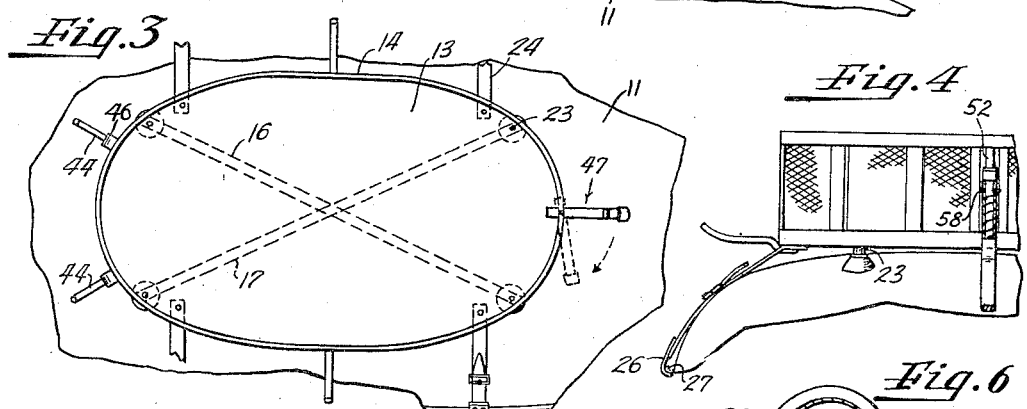
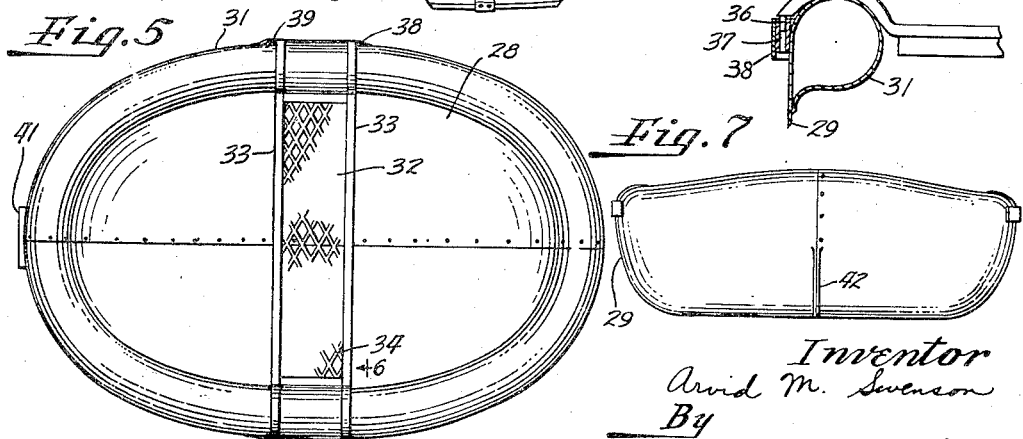
*Inventor*
Arvid M. Swenson
By
McCanna and Morsbach
*Attys.*

Patented July 27, 1954

2,684,796

UNITED STATES PATENT OFFICE 2,684,796

COMBINATION CAR TOP CARRIER AND BOAT

Arvid M. Swenson, Cornucopia, Wis.

Application August 29, 1949, Serial No. 112,900

6 Claims. (Cl. 224—42.1)

This invention relates to car top luggage carriers and more particularly to a combined car top luggage carrier and a boat associated therewith whereby the boat forms a cover for the luggage carrier and the luggage carrier provides a support for the boat.

An object of the invention is the provision of a combined luggage carrier and boat assembly of the above character having novel means for securing the boat in assembled relation with the luggage carrier.

Another object of the invention is the provision of a combined luggage carrier and boat assembly of the above character having novel means for mounting the boat on the carrier whereby one end of the boat is supported so that the other end may be swung to a raised position to permit access to the luggage carrier.

Another object of the invention is the provision of a combined luggage carrier and boat assembly of the above character in which the boat is provided with novel means for grasping the latter whereby the boat may be readily raised to permit access to the luggage carrier.

Another object of the invention is the provision of a combined luggage carrier and boat assembly of the above character wherein the boat construction is such that the boat may be readily handled by one person but is sufficiently bouyant so that it may carry a plurality of persons.

Other objects and advantages of the invention will become apparent from the following detailed description taken in connection with the accompanying drawings, in which—

Figure 1 is a fragmentary side elevational view of a car having a combined luggage carrier and boat assembly embodying the invention in which the carrier is mounted on the top of the car and the boat secured on the carrier to form a cover therefor;

Fig. 2 is a fragmentary side elevational view of the car showing the carrier in position on the car top;

Fig. 3 is a top plan view of the carrier shown in Fig. 2;

Fig. 4 is an end view of Fig. 2;

Fig. 5 is a plan view of the boat showing the removable seat in position in the boat;

Fig. 6 is a sectional view taken substantially along the line 6—6 of Fig. 5, and Fig. 7 is a front end view of the boat.

Referring now to the drawings the invention is shown embodied in a combined luggage carrier or rack and a boat assembly adapted to be mounted on a top 11 of a car 12 so that the carrier forms a support for the boat and the boat forms a cover for the carrier. As best seen in Figs. 2 and 3 the carrier comprises a bottom 13 and upstanding side walls 14. The bottom 13 has a generally oval-shaped configuration and may be formed of any suitable material such as fibreboard, synthetic resinous material, sheet metal or the like. Crosspieces 16 and 17 may be disposed beneath the bottom for reinforcing purposes. The upstanding walls 14 in this instance are defined by a wire screen 18 supported on suitable uprights 19 extending between the bottom 13 and a bead 21 spaced upwardly from the bottom. Preferably the bead is provided with a rubber or the like material covering for the purpose of preventing damage to the bead when the latter is mounted on the carrier.

The carrier is mounted on suction cups 22 as by adjustable screws 23 threaded into the reinforcing crosspieces 16 and 17 and the bottom 13 of the rack. The suction cups 22 may be of any suitable construction capable of holding the carrier on the car top 11. Adjustable straps 24 each having one end riveted to the bottom 13 and having an opposite end provided with a clip 26 shaped to engage a bead 27 formed on the side of the car between the car top 11 and the sides of the car 12 form auxiliary means for securing the carrier on the car top 11.

The boat as best seen in Figs. 5, 6 and 7 has a generally oval-shaped configuration, defined by a bottom 28 and sides 29 terminating in a tubular portion 31 spaced from the bottom. The tubular portion 31 defines a sealed chamber about the edges of the boat for the purpose of increasing the bouyancy of the boat. The tubular portion 31 together with the bottom 28 defines an oval-shaped recess shaped to receive the carrier so that the side walls 14 of the carrier are in closely spaced relation with the inner sides of the tubular portion 31. This construction forms a boat that is relatively short and wide. Preferably the boat is formed from sheet aluminum or the like light weight material so that it may be readily handled. As best seen in Fig. 5 the boat may be formed in two sections joined together by rivets along a central axis of the boat.

In normal use the boat is provided with a seat 32. The latter may be formed by spaced members 33 interconnected by a suitable shaped piece of expanded metal 34. The outer ends of the seat are arcuate shaped and are shaped to rest on the top of the tubular section 31. At their extreme outer ends, the arcuate shaped portions are formed with tongue members 36 shaped to be received in recesses 37 formed on the sides of the boat. The recesses are formed by a strip of metal 38 having its ends secured to the sides of the boat and having an intermediate portion in spaced relation to the sides of the boat. Suitable recesses 39 may also be formed on the opposite sides of the boat for receiving conventional oar locks. At one end the boat is formed with a support 41 secured to the tubular portion 31 and shaped to provide a mounting means for an outboard motor or the like. On opposite ends of the boat the latter is formed with a keel 42 as best seen in Figure 1. The bottom edge of the keel is substantially flush with the bottom of the boat and the ends of the keel are substantially flush with the respective ends of the boat. An aperture 43 is provided at the outer end of each keel 42 to define a handle portion 45 for gripping the boat to facilitate handling thereof.

Suitable provision is made for positively securing the boat on the carrier. For this purpose spaced arms 44 are formed to extend outwardly from one end of the carrier as shown in Fig. 3. Preferably, see Figs. 1 and 2, the arms have an arcuate shaped end, having a configuration complementary to that of the top of the tubular portion 31. Spaced above each arm 44 and secured to the carrier is a bracket 46 shaped to engage the periphery of the tubular portion 31 at a position spaced upwardly from each arm 44. The brackets 46 and the arms 44 are spaced so that in effect they define a cradle for receiving the tubular portion 31 of the boat. At the opposite end of the carrier is a clamping assembly 47 also shaped to engage the tubular portion 31 of the boat and operative with the cradle to secure the boat in a position so that the boat forms a cover for the carrier. The clamping assembly in this instance comprises a generally U-shaped member having a horizontal arm 48 and a horizontal arm or handle 49 interconnected by a vertical bridging portion 51. The U-shaped member is pivotally mounted on a vertical upright 52 as by having the upright pass through apertures in the arm 48 and the handle 49 adjacent the bridging portion 51. The upright 52 is suitably supported at its top and bottom as best shown in Figs. 2 and 4. With the above construction the arm 48 and the handle 49 can be swung in horizontal planes between the full line position shown in Fig. 3 in which the arm engages the tubular portion 31 of the boat and an unlocking position in which the arm 48 is free of the tubular portion 31 so that the boat can be removed from the top of the carrier. The arm 48 is preferably provided with an end 56 shaped to be received in a recess formed on the underside of the tubular portion 31 as best seen in Figure 1 to insure proper positioning of the parts. A spring 57 mounted on the upright 52 acts between a pin 58 (see Fig. 4) on the upright 52 and the handle 49 to urge the arm 48 into tight engagement with the tubular portion 31 of the boat to secure the latter on the carrier as shown in Figure 1.

When it is desired to lift the boat to gain access to the luggage carrier the handle 49 is rotated to its unlocking position which is substantially shown by dotted lines in Fig. 3. With the U-shaped member in this position the user places his fingers through the opening 43 in the keel of the boat and grasps the handle 45. The user then raises one end of the boat. As the end of the boat is raised the arms 44 define a pivotal support about which the boat may swing. When the boat is raised the carrier is accessible to the user. When it is desired to re-cover the luggage carrier the operator grasps the handle 49 and positions it and the arm 48 in their unlocking position. The user then lowers the front end of the boat. As soon as the boat returns to the position shown in Figure 1, the arm 48 and the handle 49 are rotated to the full line position shown in Fig. 3 so that the end 56 of the arm 48 is received in the recess on the tubular portion 31 to positively secure the boat in position on the carrier. The spring 57 positively urges the arm 48 into engagement with the tubular portion 31. Under these conditions the boat in effect forms a cover for the carrier that cannot be accidentally removed.

When it is desired to remove the boat entirely from the car top the operator proceeds in the manner described above but continues swinging the front end of the boat up to the position wherein the boat can be pulled from the carrier, it being understood that the cradle supports at the back end of the boat permit the ready removal of the boat once the boat is swung to the position in which it can clear the side walls 14 of the carrier. After the boat is removed the removable seat is mounted on the boat as shown in Fig. 5 so that the tongue 36 is disposed in the recess 37 formed on the sides of the boat. The boat is then ready for operation. If oars are used, oar locks may be mounted in recesses 39. An outboard motor may be mounted on the mounting support 41 at the back of the boat if desired.

This construction is extremely simple and has many advantages. The handles provided in the keel at opposite ends of the boat permit the boat to be readily handled when it is desired to remove the boat from the carrier. In case it is desired to gain access only to the carrier the handles permit the boat to be readily raised and lowered by one person.

I claim:

1. In combination, a car top luggage carrier comprising a bottom, and side walls extending upwardly from the edges of the bottom and rigid therewith, means for mounting the carrier on a car top, a boat comprising a bottom and side portions defining a recess shaped to receive the side walls of the carrier, said boat when inverted and mounted on said carrier forming a cover for the carrier, means at one end of the carrier engageable with a side portion of the boat to define a cradle support for one end of the boat, and clamping means swingably mounted on the opposite end of the carrier movable between a position in which the clamping means engages the side portion at the opposite end of the boat and together with the cradle secures the boat on the carrier and a position in which the clamping means is free of the side portion on the boat whereby said boat may be swung about the cradle support for access to the carrier.

2. In combination, a carrier having upstanding side walls, means for mounting said carrier on a car top, a boat comprising a bottom and tubular side walls, said boat when in the inverted position shaped to have its side walls in closely spaced relation with the upstanding side walls and the bottom overlying the bottom of the carrier to form a cover for the carrier, a pair of arms extending outwardly from one end of the carrier to define a support for one end of the boat about which the other end of the boat may swing, bracket means in spaced relation with said arms shaped to engage the tubular portion of the boat in spaced relation to those portions of the tubular portion engaged by the arms and to define with said arms a cradle support for securing said end of the boat in position on the carrier, and a U-shaped member pivotally mounted on said carrier including arms spaced apart the width of the tubular portion and movable between a position in which the arms straddle the tubular portion to secure the opposite end of the boat in tightly assembled relation with the carrier and a position in which the arms are positioned to be free of the tubular portion to permit swinging of the boat about the cradle support.

3. In combination, a carrier having upstanding side walls, means for mounting said carrier on a car top, a boat comprising a bottom and tubular side walls, said boat when in the inverted position shaped to have its side walls in closely spaced relation with the upstanding side walls and the bottom overlying the bottom of the carrier to form a cover for the carrier, at least one arm extending outwardly from one end of the carrier to define a support for one end of the boat about which the other end of the boat may swing, bracket means in spaced relation with said arm shaped to engage the tubular portion of the boat in spaced relation to that portion of the tubular portion engaged by the arm and to define with said arm a cradle support for securing said end of the boat in position on the carrier, a U-shaped member pivotally mounted on said carrier including arms spaced apart the width of the tubular portion and movable between a first position in which the arms straddle the tubular portion to secure the opposite end of the boat in tightly assembled relation with the carrier and a second position in which the arms are free of the tubular portion to permit swinging of the boat about the cradle support, and spring means associated with said U-shaped member to urge one of said arms into tight engagement with the tubular portion when the U-shaped member is in its first position.

4. In combination, a support member having upstanding side portions, means for mounting said support member on a vehicle top to extend upwardly above the same, spaced protruding portions connected to said upstanding sides and extending transversely outward thereof on opposite sides of the support member adjacent one end thereof, a boat formed with a bottom and upstanding sides, said boat at its side portion on one end being formed with a portion protruding transversely of the upward extent of said side portion, said boat being invertedly positioned over the vehicle top with its side portions remote from said transverse end protrusion on the boat engaging said transverse protrusions on the support member to be carried thereby, a clamping member pivotally mounted on the support member at the end thereof remote from the transverse protrusions, said clamping member in one position engaging snugly above and below the transverse end protrusion on the boat to secure the same in position, said clamping member being movable about its pivotal axis to a position disengaged from said transverse end protrusion on the boat to permit removal of the boat from the support member.

5. In combination, a support member having upstanding sides, means for mounting said support member on a car top to extend upwardly above the same, spaced protruding portions connected to said upstanding sides and extending transversely outward thereof on opposite sides of the support member adjacent one end thereof, a boat formed with a bottom and upstanding sides, said boat at the top of a side portion thereof being formed with a portion protruding toward the interior of the boat, said boat being invertedly positioned over the car top with the top of its side portions remote from said protruding portion on the boat engaging said transverse protrusions on the support member to be carried thereby, a U-shaped clamping member mounted on the support member remote from the transverse protrusions thereof and having spaced legs shaped to snugly engage above and below said protruding portion on the boat for securing the boat in assembled relation on the support member, said clamping member being pivotally mounted about an upwardly extending axis to swing to a position where its upper leg is out of engagement with the protruding portion formed on the side of the boat to permit removal of the boat from the support member.

6. In combination, a portable car top luggage carrier comprising a box-like structure adapted to be supported upon the top of an automobile sedan, said carrier having a bottom for the support of luggage and upstanding side walls around the edges of the bottom rigid therewith for confining the luggage against lateral displacement, means for removably mounting the carrier on a car top in spaced relationship thereabove, a rigid portable water tight cover for said carrier in the form of an inverted boat comprising a carrier spanning portion shaped to span the upper edges of the carrier side walls and depending side portions fixed to the carrier spanning portion along the perimeter thereof to form when upright a water tight boat, and when inverted to extend downwardly along the outer side of the carrier side walls, means disposed at one end of the carrier for cradling the cover along one side portion for rotation of the cover about a horizontal axis so that the cover may be tilted for access to the interior of the carrier without removal of the cover, and means for latching the cover to the carrier.

References Cited in the file of this patent

UNITED STATES PATENTS

| Number | Name | Date |
|---|---|---|
| 671,502 | Sultemeyer | Apr. 9, 1901 |
| 1,035,046 | Pitre | Aug. 6, 1912 |
| 2,109,571 | Le Boeuf | Mar. 1, 1938 |
| 2,211,083 | Smith | Aug. 13, 1940 |
| 2,247,128 | Levey | June 24, 1941 |
| 2,266,769 | Kramer | Dec. 23, 1941 |
| 2,287,055 | Olson | June 23, 1942 |
| 2,310,431 | Hart | Feb. 9, 1943 |
| 2,446,092 | Lait | July 27, 1948 |
| 2,479,035 | Burkey | Aug. 16, 1949 |
| 2,597,656 | Martin | May 20, 1952 |
| 2,598,458 | Somers | May 27, 1952 |

FOREIGN PATENTS

| Number | Country | Date |
|---|---|---|
| 612,639 | France | Aug. 3, 1926 |
| 364,267 | Italy | Oct. 26, 1938 |